US012496692B2

(12) United States Patent
Lee et al.

(10) Patent No.: US 12,496,692 B2
(45) Date of Patent: Dec. 16, 2025

(54) NAIL GUN FIRING STRUCTURE

(71) Applicants: Samson Power Tool Co., LTD., Taichung (TW); Power Tech Staple and Nail Inc., Monterey Park, CA (US)

(72) Inventors: Yi-Kuan Lee, Taichung (TW); Guan-Yu Lin, Taichung (TW)

(73) Assignees: Samson Power Tool Co., LTD., Taichung (TW); Power Tech Staple and Nail Inc., CA (US)

( * ) Notice: Subject to any disclaimer, the term of this patent is extended or adjusted under 35 U.S.C. 154(b) by 0 days.

(21) Appl. No.: 18/754,088

(22) Filed: Jun. 25, 2024

(65) Prior Publication Data

US 2025/0249562 A1 Aug. 7, 2025

(30) Foreign Application Priority Data

Feb. 2, 2024 (TW) ................................ 113104277

(51) Int. Cl.
*B25C 1/04* (2006.01)
*B25C 1/00* (2006.01)

(52) U.S. Cl.
CPC .............. *B25C 1/008* (2013.01); *B25C 1/005* (2013.01); *B25C 1/04* (2013.01)

(58) Field of Classification Search
CPC ............ B25C 1/008; B25C 1/005; B25C 1/04
USPC .......................................................... 227/120
See application file for complete search history.

(56) References Cited

U.S. PATENT DOCUMENTS

| | | | | | |
|---|---|---|---|---|---|
| 5,683,024 | A * | 11/1997 | Eminger | B25C 1/003 | 227/128 |
| 6,938,809 | B1 * | 9/2005 | Schnell | B25C 1/008 | 227/8 |
| 2005/0023323 | A1 * | 2/2005 | Jalbert | B25C 1/008 | 227/120 |
| 2009/0045239 | A1 * | 2/2009 | Jian | B25C 1/005 | 227/120 |
| 2010/0206933 | A1 * | 8/2010 | Wu | B25C 1/08 | 227/8 |
| 2013/0320066 | A1 * | 12/2013 | Gregory | B25C 1/005 | 227/126 |
| 2018/0093370 | A1 * | 4/2018 | Yip | B25C 1/005 | |
| 2022/0371170 | A1 * | 11/2022 | Ou | B25C 1/043 | |
| 2025/0091183 | A1 * | 3/2025 | Huang | B25C 1/008 | |

* cited by examiner

*Primary Examiner* — Praachi M Pathak
(74) *Attorney, Agent, or Firm* — Che-Yang Chen; Law Office Of Michael Chen

(57) ABSTRACT

A nail gun includes a gun body with a magazine which has a slot defined through a wall thereof. A linkage is movable relative to the magazine and includes a bent upper end and a bent lower end. The lower end of the linkage passes through the slot and enters into a nail groove in the magazine. The linkage includes a first pivot and a second pivot respectively contacting the magazine and the guard. A guard has a protrusion abutting against the second pivot. When nailing has reached a safe nailing quantity and stopped firing, the upper end of the linkage is pressed to move the lower end of the linkage outward the magazine until the lower end of the linkage clears a path of the nail-pushing piece, such that the nail-pushing piece moves forward again to fire the nails remained.

10 Claims, 6 Drawing Sheets

NAIL GUN FIRING STRUCTURE

FIELD OF THE INVENTION

The present invention relates to a nail gun, and more particularly, to a nail gun which restarts the non-firing mode formed by reaching the minimum allowable safe nailing quantity inside the magazine, and then fire the remaining nails one by one.

BACKGROUND OF THE INVENTION

The general structure of a nail gun typically includes a gun body, a trigger set on the gun body, a nozzle set on the gun body, and a magazine set on the nozzle. One end of the trigger is set on the gun body, maintaining relative rotatability between the trigger and the gun body for control operation. A row of nails is housed within the magazine and is forced to move towards the nozzle by the internal nail-pushing piece, following the direction of the nail guide groove of the magazine. Consequently, when attaching thin wooden boards together to form a ceiling at a height, one hand is needed to press and secure the thin wooden board while the other hand lifts the gun body and aligns its nozzle with the desired nailing position. Then, the trigger can be pressed to drive the nails already positioned in the nozzle smoothly into the thin wooden board. In this manner, the nozzle will sequentially press and release along the perimeter of the thin wooden board. At this point, if the number of nails in the magazine decreases to a predetermined amount (i.e., remaining nail quantity), it will prevent the nail-pushing piece from moving forward. Simultaneously, the trigger cannot be pressed to activate the switch valve, ensuring that the piston striker does not rapidly impact the thin wooden board, thereby avoiding dents and preserving aesthetics. This achieves the effective control of safe nailing quantity.

During the operation process, the following shortcomings may occur:

Due to the construction operations carried out at heights, workers typically aim the nozzle at the four corners of the thin wooden board before pressing the trigger to fire the nails. However, due to consecutive nailing operations, workers often cannot know the remaining nail quantity in the magazine in advance. This results in situations where, when working with a new thin wooden board lifted and placed at the ceiling, workers may only fire nails from the corners of the new thin wooden board. In some cases, they may even fire only one nail before reducing the quantity of nails in the magazine to the minimum allowable predetermined safe nailing quantity, preventing further pressing of the trigger and the nail-pushing piece from moving forward (i.e., unable to fire). Consequently, only one corner of the new thin wooden board is nailed to the ceiling, leaving it hanging in the air. In such circumstances, it becomes uncertain whether the new thin wooden board, hanging with only one corner nailed, can be securely fixed to the ceiling to maintain its suspension (thus not complying with safety regulations). Alternatively, if the nails cannot bear the weight of the new thin wooden board, the entire board may need to be removed. These situations pose significant inconveniences to workers operating at heights.

The present invention intends to provide a nail gun to eliminate the shortcomings mentioned above.

SUMMARY OF THE INVENTION

The present invention relates to a nail gun and comprises a gun body, a trigger connected to the gun body, a nozzle connected to the gun body, a magazine connected to gun body and located close to the nozzle, a nail-pushing piece movably located within the magazine, a linkage movable relative to the magazine, and a guard for retaining and limiting a displacement of the linkage. The magazine includes a nail groove for a movement of nails and the nail-pushing piece. A slot is defined through a wall of the magazine and communicates with the nail groove. One of two ends of the linkage is bent to form an upper end adjacent to the trigger, another one of the two ends of the linkage is bent to form a lower end. The lower end of the linkage passes through the slot and enters into the nail groove. An outer surface of the linkage between the upper end and the lower end have a first pivot and a second pivot. The first and second pivots respectively contact the magazine and the guard. An actuating portion is formed on the linkage between the upper end and the second pivot. A first spring is located between the actuating portion and the second pivot. A side protrusion is formed on a side of the linkage between the first pivot and the lower end. The guard has a protrusion and a positioning portion. The protrusion abuts against the second pivot of the linkage. A second spring is biased between the side protrusion and the positioning portion of the guard.

When nailing has reached a safe nailing quantity and stopped firing, the actuating portion is pressed to move a distal end of the lower end of the linkage outward the magazine until the lower end of the linkage completely clears a path of the nail-pushing piece, such that the nail-pushing piece moves forward again to fire the nails remained.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
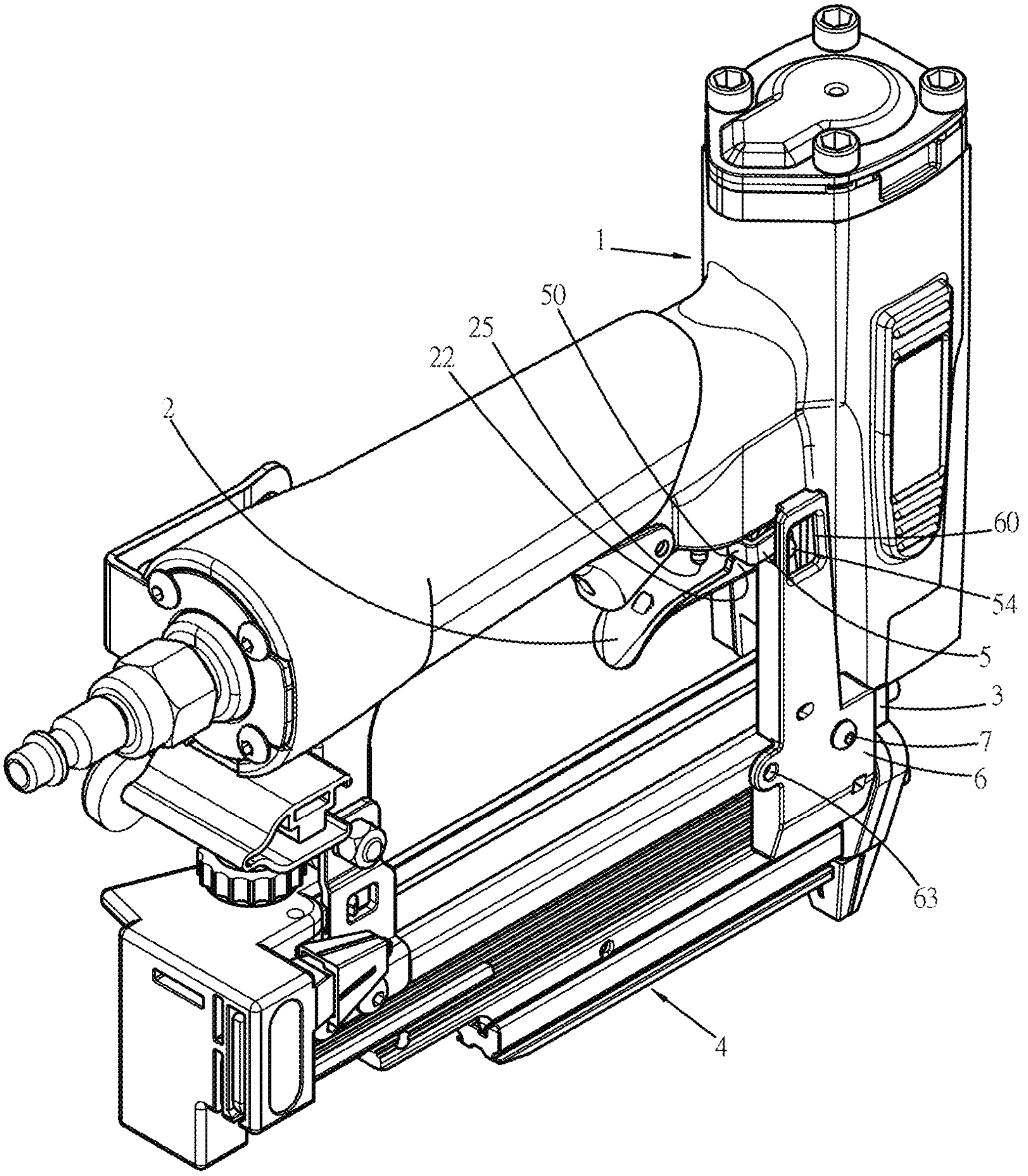
FIG. 1 is a perspective view of the nail gun of the present invention.
Figure 2:
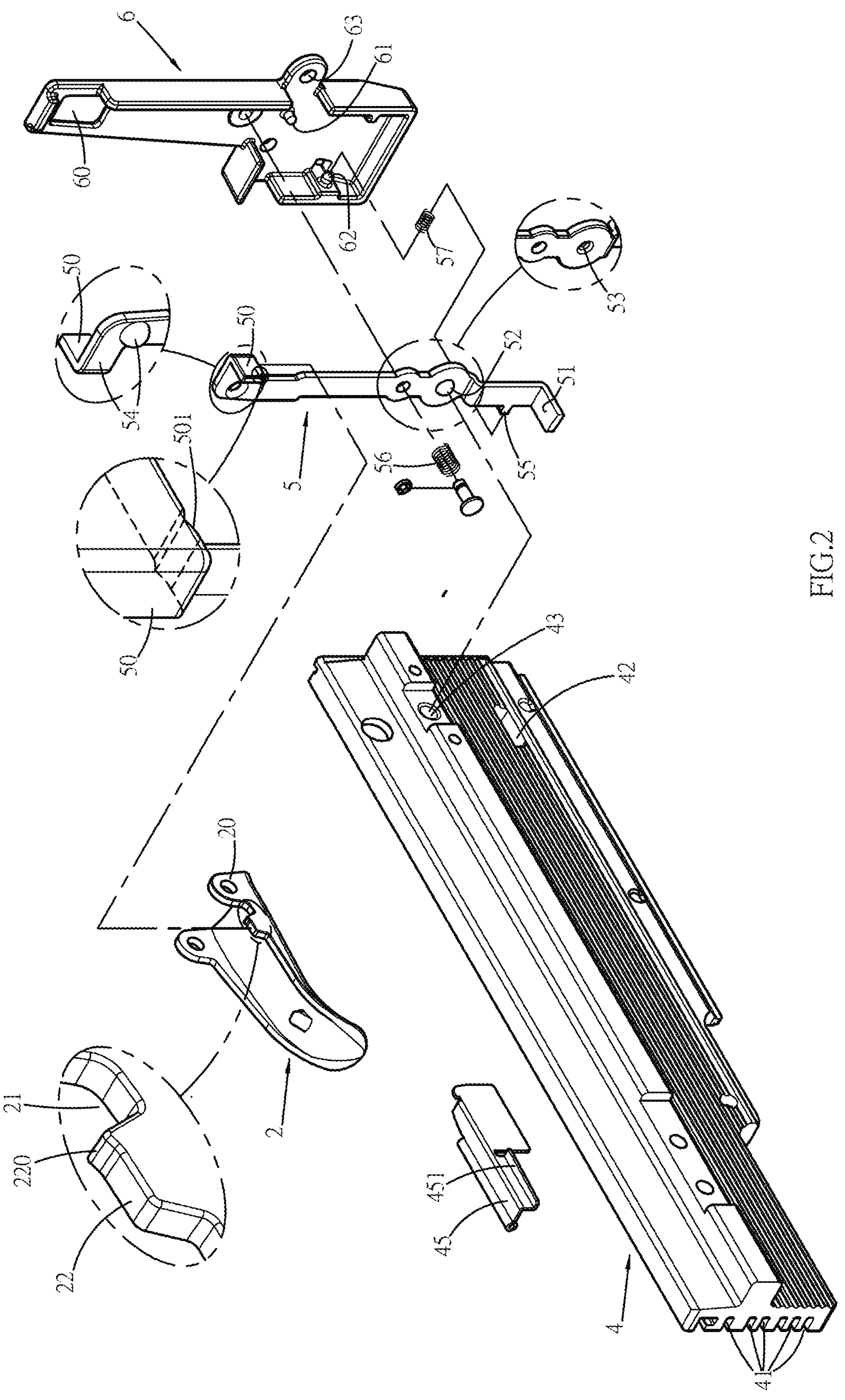
FIG. 2 is an exploded view of a portion of the nail gun of the present invention.

Referring to FIGS. 1 to 9, the nail gun of the present invention comprises a gun body 1, a trigger 2 and a nozzle 3 respectively connected to the gun body 1, and a magazine 4 connected to gun body 1 and located close to the nozzle 3. A nail-pushing piece 45 is movably located within the magazine 4. A linkage 5 is movable relative to the magazine 4. A guard 6 is mounted to one side of the gun body 1 to retain and limit a displacement of the linkage 5.

The trigger 2 includes two lugs 20 connected to the gun body 1, and a stop block 22 is located at one of two sidewalls of the trigger 2. A recess 21 is formed between one of the two lugs 20 and the stop block 22. The stop block 22 includes a convex portion 220.

Figure 9:
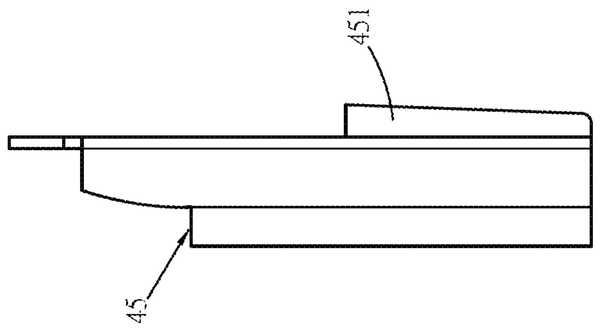
FIG. 9 is a top view of the nail-pushing piece in FIG. 2.

The magazine 4 includes a nail groove 41 for a movement of nails 71 and the nail-pushing piece 45. A slot 42 is defined through a wall of the magazine 4 and communicates with the nail groove 41. The magazine 4 further includes a dent 43 for abutment of a first pivot 52 of the linkage 5. The dent 43 of the magazine 4 is a semi-spherical groove. The nail-pushing piece 45 includes a side tail piece 451, and a distal end edge of the side tail piece 451 is tapered as shown in FIG. 9.

Figure 8:
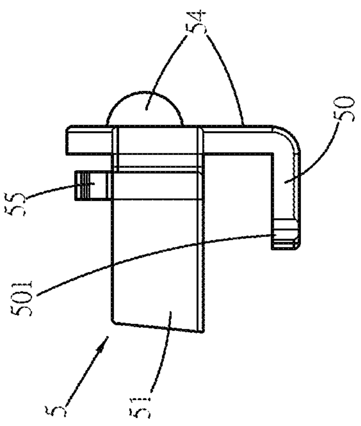
FIG. 8 is a top view of the linkage in FIG. 2.

One of two ends of the linkage 5 is bent to form an upper end 50 adjacent to the trigger 2, and another one of the two ends of the linkage 5 is bent to form a lower end 51. A recessed area 501 is formed on an underside of the upper end portion 50 of the linkage 5. The lower end 51 of the linkage 5 passes through the slot 42 and enters into the nail groove 41. A distal end of the lower end 51 is a plane which is tapered so as to reduce the resistance in the movement path of the side tail piece 451 of the nail-pushing piece 45 inside the nail groove 41, as shown in FIG. 8. An outer surface of the linkage 5 between the upper end 50 and the lower end 51 has a first pivot 52 and a second pivot 53. The first and second pivots 52, 53 are located on a common axis of the linkage 5. The first and second pivots 52, 53 are protruding cylindrical bodies, and an end of each of the cylindrical bodies is semi-spherical, spherical, or a semi-spherical groove. The first and second pivots 52, 53 respectively contact the magazine 4 and the guard 6. An actuating portion 54 is formed on the linkage 5 between the upper end 50 and the second pivot 53. A first spring 56 is located between the actuating portion 54 and the second pivot 53. A side protrusion 55 is formed on a side of the linkage 5 between the first pivot 52 and the lower end 51.

The guard 6 has a protrusion 61 and a positioning portion 62. The protrusion 61 abuts against the second pivot 53 of the linkage 5. A second spring 57 is biased between the side protrusion 55 and the positioning portion 62 of the guard 6. The guard 6 further includes a window 60 so as to restrict movement of the actuating portion 54 of the linkage 5. The window 60 can also be replaced by a. open area. The guard 6 includes fixing holes 63 for securing the guard 6 to the magazine 4 or the gun body 1 by bolts 7. The protrusion 61 of the guard 6 is a semi-spherical groove or a cylindrical body.

Figure 3:
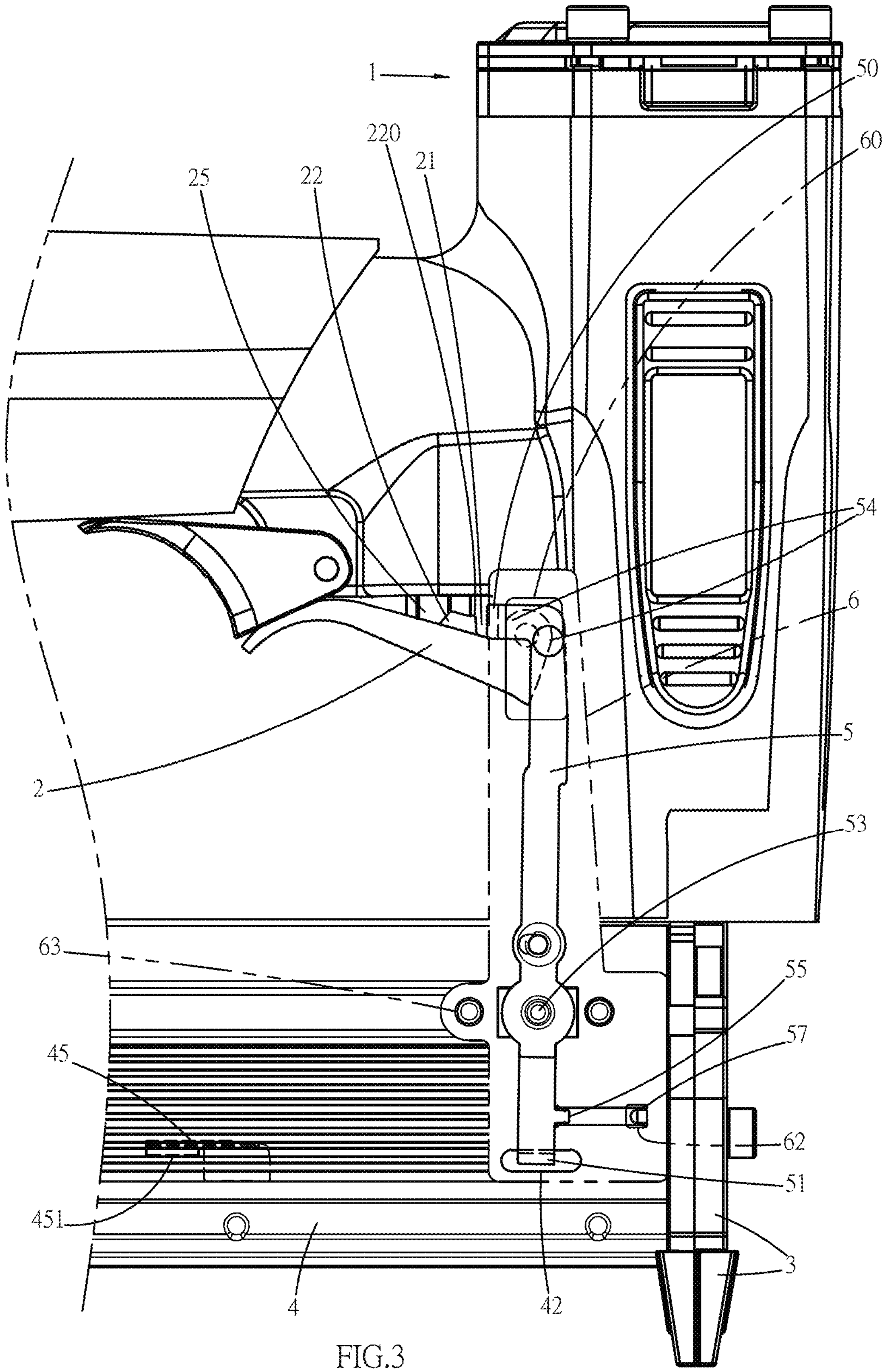
FIG. 3 shows the trigger operation under normal nailing quantity.
Figure 4:
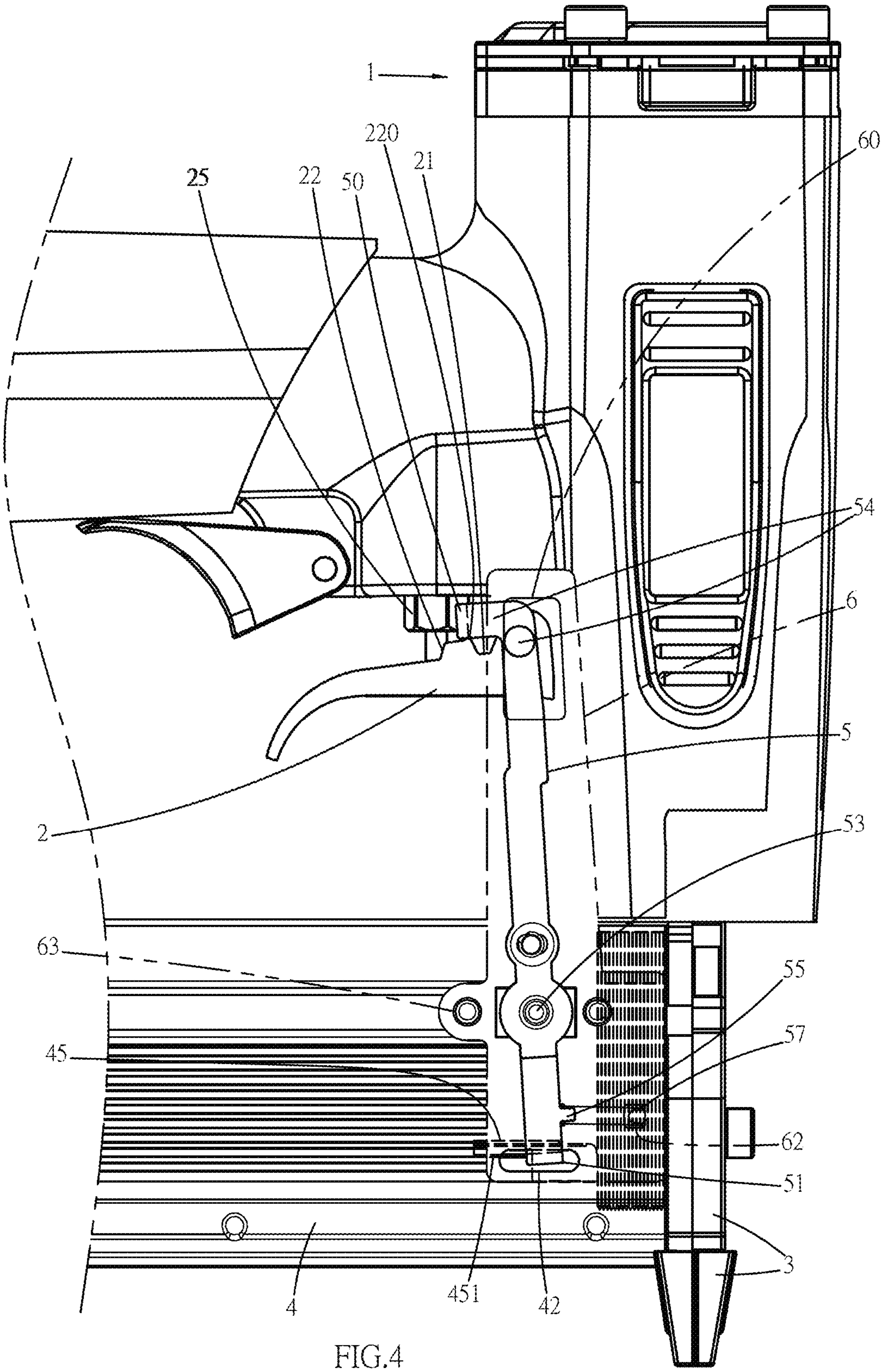
FIG. 4 shows the trigger operation when reaching the safe nailing quantity during trigger operation.

Please refer to FIG. 3, when a row of nails 71 (i.e., several of these nails 71 arranged side by side as a whole) is loaded into the magazine 4, the nail-pushing piece 45 inside the magazine 4 pushes the nails 71 forward into the nozzle 3 and wait to be fired. At this point, pressing the trigger 2 activates the switch valve 25 located on the gun body 1 and drives the piston striker (not shown in the figure) to strike the nails 71 inside the nozzle 3 downward and driving them into the object (not shown in the figure). Through this cyclic operation, the nail-pushing piece 45 continues to push the nails 71 along the nail groove 41 into the nozzle 3 until the side tail piece 451 of the nail-pushing piece 45 moves along the nail groove 41 and pushes forward the lower end 51 of the linkage 5 which passes through the slot 42 within the nail groove 41 (i.e., the path of movement of the nail-pushing piece 45) as shown in FIG. 4. At this point, the linkage 5 rotates about the first and second pivots 52, 53, forcing the upper end portion 50 of the linkage 5 to move backward (or clockwise rotation) until the upper end portion 50 moves above the stop block 22 of the trigger 2. When the trigger 2 is pressed again, the stop block 22 is blocked by the upper end portion 50 and cannot move upward, preventing the switch valve 25 from driving the piston striker (not shown in the figure) to actuate (as shown in FIG. 4). Consequently, the safety operation is achieved, where firing cannot occur again at the preset safe nailing quantity (or remaining nail quantity).

Figure 5:
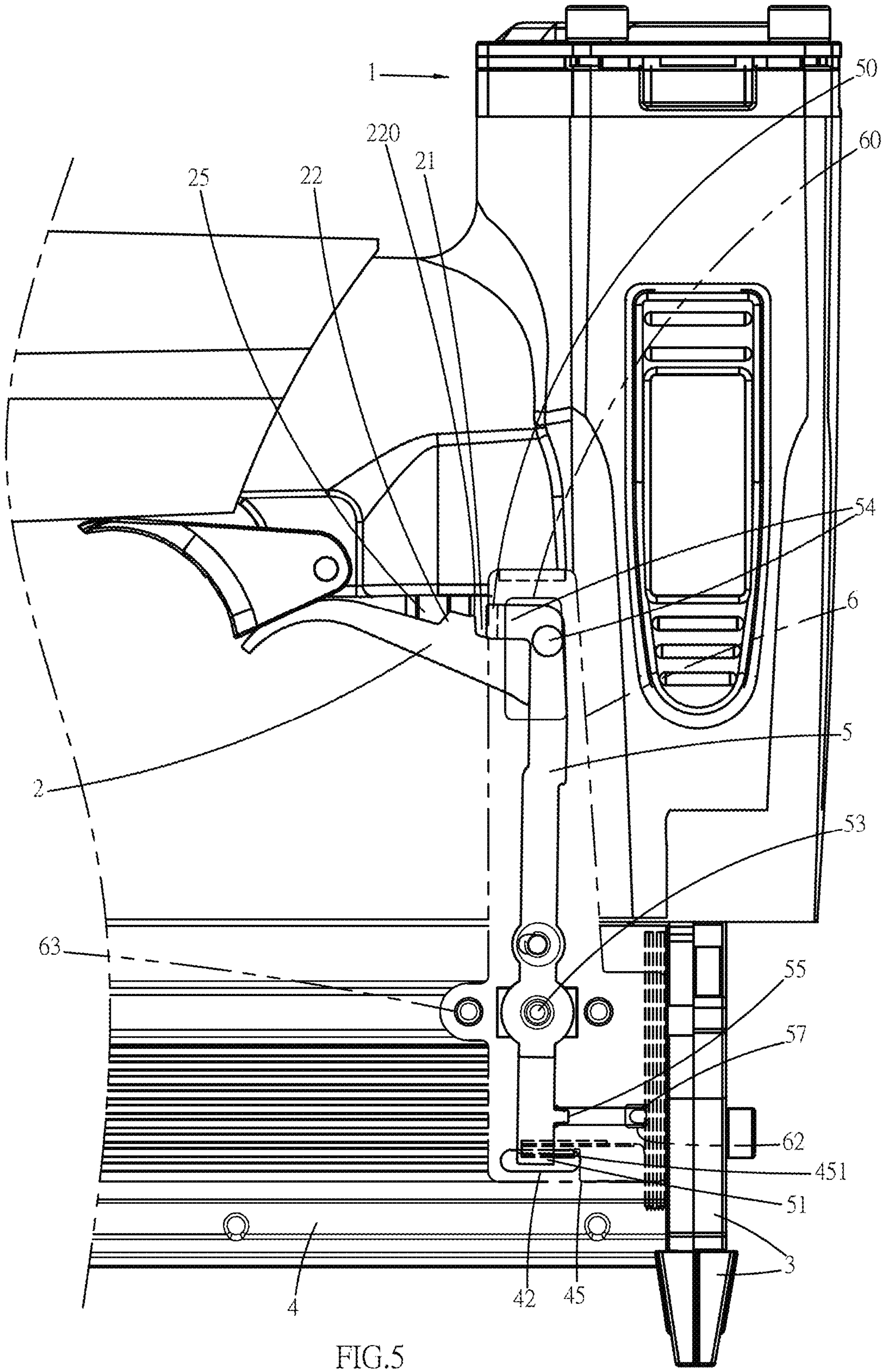
FIG. 5 shows the trigger operation after forced firing.
Figure 7:
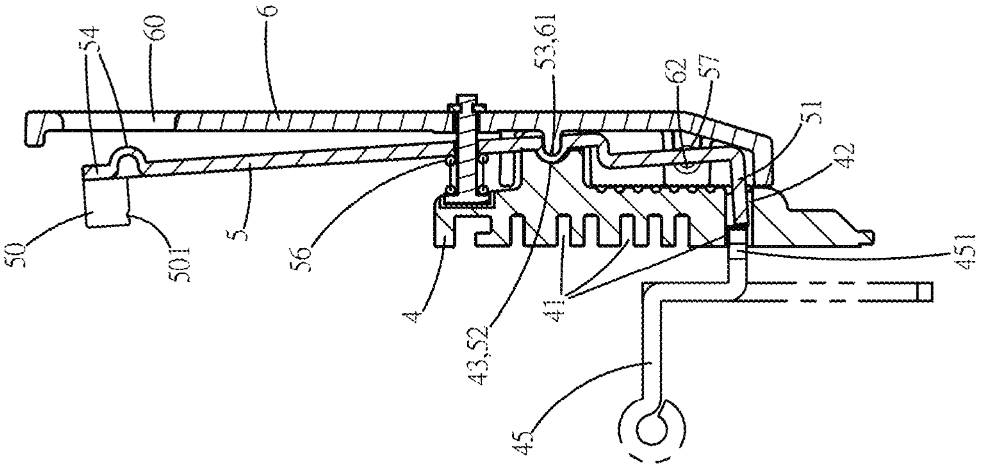
FIG. 7 is a partial cross sectional view of FIG. 5.
Figure 6:
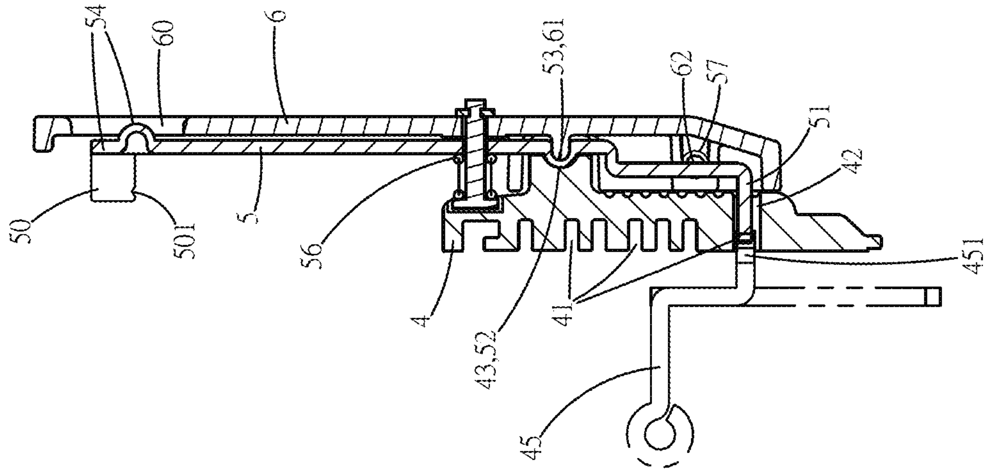
FIG. 6 is a partial cross sectional view of FIG. 3.

At this point, if the users are finishing the final quantity of nailing, they only need to apply force to press the actuating portion 54 of the linkage 5 downward. Simultaneously, the linkage 5 rotates again about the first and second pivots 52, 53, forcing the lower end 51 to move from inside the slot 42 towards the outer side (or top) of the magazine 4 until the lower end 51 completely exits the path of movement of the nail-pushing piece 45 (or the end of the lower end 51 enters the slot 42, as shown in FIGS. 5 and 7). This ensures that there is no resistance on the path of movement of the nail-pushing piece 45, facilitating its forward movement and allowing the remaining nails 71 inside the magazine 4 to be forcibly fired into the object, providing rapid nail replenishment operations without changing the nails 71 during on-site work. This increases the safety and convenience of working at heights and greatly improves construction efficiency. Additionally, it allows for the complete reuse of the remaining nails 71 inside the magazine 4, without wasting them, thereby significantly reducing overall costs.

The present invention achieves, by applying force to press the actuating portion 54, causing the lower end 51 of the linkage 5 to move outward until the lower end 51 is not in the path of movement of the nail-pushing piece 45 (or enters the slot 42), thereby ensuring that there is no resistance on the path of movement of the nail-pushing piece 45. This facilitates the forward movement of the nail-pushing piece 45, allowing the remaining nails 71 inside the magazine 4 to be forcibly fired into the object, providing rapid nail replenishment operations without changing the nails 71 during on-site work. This increases the safety and convenience of working at heights and greatly improves construction efficiency. Additionally, it allows for the complete reuse of the remaining nails 71 inside the magazine 4, without wasting them, thereby significantly reducing overall costs and increasing competitiveness.

While we have shown and described the embodiment in accordance with the present invention, it should be clear to those skilled in the art that further embodiments may be made without departing from the scope of the present invention.

What is claimed is:

1. A nail gun comprising:

a gun body (1), a trigger (2) connected to the gun body (1), a nozzle (3) connected to the gun body (1), a magazine (4) connected to gun body (1) and located close to the nozzle (3), a nail-pushing piece (45) movably located within the magazine (4), a linkage (5) movable relative to the magazine (4), and a guard (6) for retaining and limiting a displacement of the linkage (5);

the magazine (4) including a nail groove (41) for a movement of nails (71) and the nail-pushing piece (45), and a slot (42) defined through a wall of the magazine (4) and communicating with the nail groove (41);

one of two ends of the linkage (5) being bent to form an upper end (50) adjacent to the trigger (2), another one of the two ends of the linkage (5) being bent to form a lower end (51), the lower end (51) of the linkage (5) passing through the slot (42) and entering into the nail groove (41), an outer surface of the linkage (5) between the upper end (50) and the lower end (51) having a first pivot (52) and a second pivot (53), the first and second pivots (52, 53) respectively contacting the magazine (4)

and the guard (6), an actuating portion (54) formed on the linkage (5) between the upper end (50) and the second pivot (53), a first spring (56) located between the actuating portion (54) and the second pivot (53), a side protrusion (55) formed on a side of the linkage (5) between the first pivot (52) and the lower end (51);

the guard (6) having a protrusion (61) and a positioning portion (62), the protrusion (61) abutting against the second pivot (53) of the linkage (5), a second spring (57) being biased between the side protrusion (55) and the positioning portion (62) of the guard (6), when nailing has reached a safe nailing quantity and stopped firing, the actuating portion (54) is pressed to move a distal end of the lower end (51) of the linkage (5) outward the magazine (4) until the lower end (51) of the linkage (5) clears a path of the nail-pushing piece (45), such that the nail-pushing piece (45) moves forward again to fire the nails (71) remained.

2. The nail gun as claimed in claim 1, wherein the trigger (2) includes two lugs (20) connected to the gun body (1), a stop block (22) located at one of two sidewalls of the trigger (2), and a recess (21) formed between one of the two lugs (20) and the stop block (22).

3. The nail gun as claimed in claim 2, wherein a distal end of the lower end (51) is a plane which is tapered.

4. The nail gun as claimed in claim 3, wherein the nail-pushing piece (45) includes a side tail piece (451), a distal end edge of the side tail piece (451) is tapered.

5. The nail gun as claimed in claim 4, wherein the guard (6) includes fixing holes (63) for securing the guard (6) to the magazine (4) or the gun body (1) by bolts (7).

6. The nail gun as claimed in claim 5, wherein the first and second pivots (52, 53) are located on a common axis of the linkage (5), the first and second pivots (52, 53) are protruding cylindrical bodies, an end of each of the cylindrical bodies is semi-spherical or spherical, the magazine (4) includes a dent (43) for abutment of the first pivot (52) of the linkage (5).

7. The nail gun as claimed in claim 6, wherein the first and second pivots (52, 53) are located on a common axis of the linkage (5), the first and second pivots (52, 53) are semi-spherical grooves, the magazine (4) includes a dent (43) for abutment of the first pivot (52) of the linkage (5).

8. The nail gun as claimed in claim 7, wherein the dent (43) of the magazine (4) and the protrusion (61) of the guard (6) are both semi-spherical grooves.

9. The nail gun as claimed in claim 8, wherein the stop block (22) includes a convex portion (220), a recessed area (501) is formed on an underside of the upper end portion (50) of the linkage (5).

10. The nail gun as claimed in claim 1, wherein the magazine (4) includes a dent (43) for abutment of the first pivot (52) of the linkage (5), the dent (43) of the magazine (4) and the protrusion (61) of the guard (6) are protruding cylindrical bodies, a distal end of each of the cylindrical bodies is semi-spherical or spherical.

* * * * *